 3,331,969
CIRCUIT FOR REPRODUCTION OF A PLURALITY
OF SIMILAR LOW-LEVEL D.C. SIGNALS
James Derwin King, San Antonio, Tex., assignor, by mesne assignments, to Plastic Applicators, Inc., a corporation of Texas
Filed Oct. 8, 1964, Ser. No. 402,551
8 Claims. (Cl. 307—88.5)

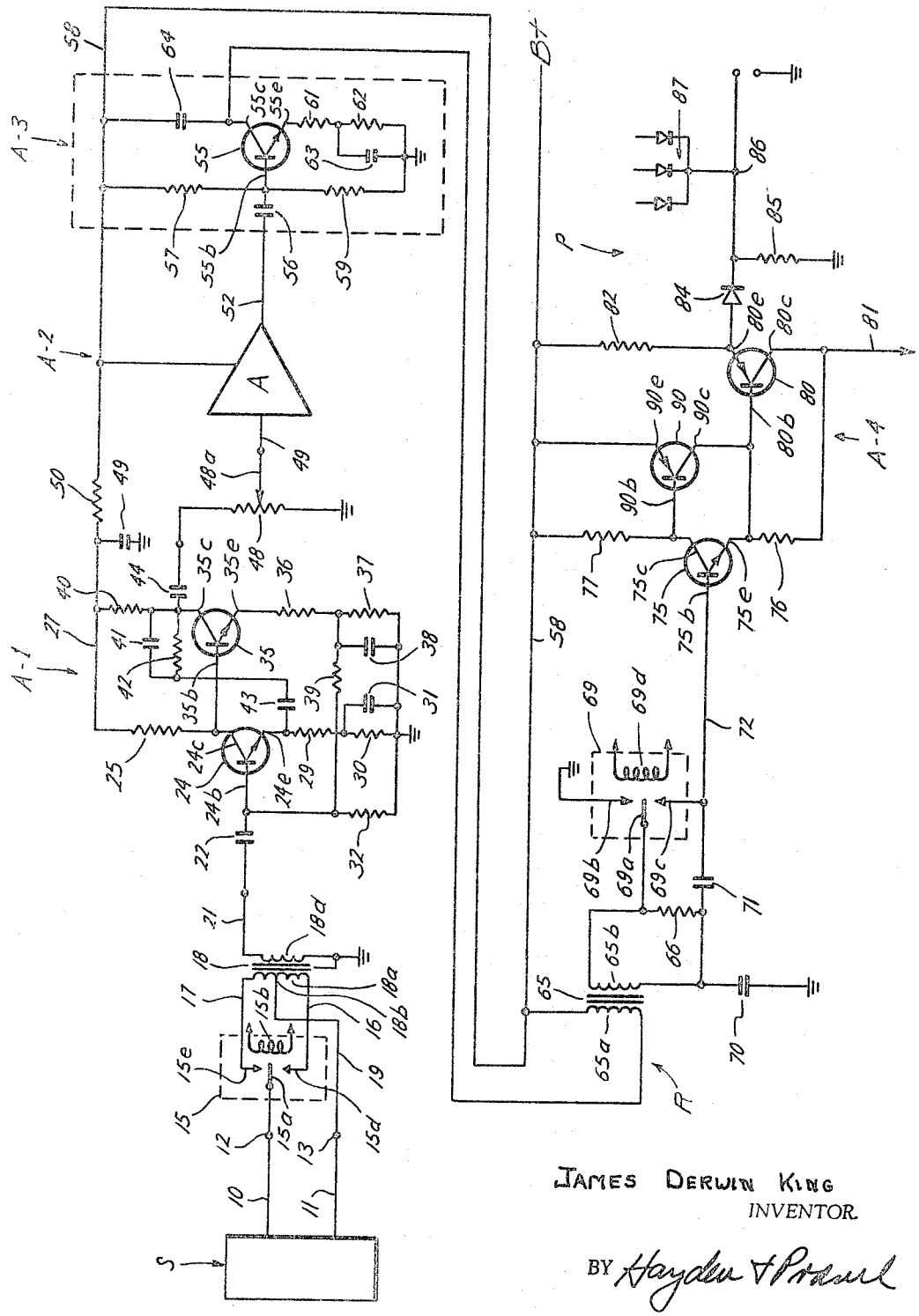

This invention relates to a circuit for installation in signal reproduction apparatus and more particularly relates to amplifying and selecting circuit for use in a magnetic pipe inspection device wherein a plethora of indications in the form of low-level DC signals is elicited from which data only certain indications are desirable for indicating the structural character of an elongate member.

Inspection of ferromagnetic tubular members is performed after magnetization of the structure of a member by scanning the structure with inductive sensors or other devices to detect magnetic field variations exterior the outer surface of the member indicative of flaws, voids, seams, and other structural anomalies in the wall structure of the elongate member. In pipe inspection systems such as that exemplified in copending patent application Ser. No. 347,456, filed Feb. 26, 1964, by John F. Heinrichs and David R. Tompkins, the inductive sensors are positioned circumferentially about the locus of an elongate member whereby the outer surface of the entire member is scanned or inspected with a view of locating the above mentioned magnetic field variations. It may be appreciated that several inductive sensors are often desirable and sometimes necessary.

The data provided by a plurality of magnetic field variation sensors is reproduced for visual inspection indicating the character of the tubular member with acceptance or rejection of the member dependent on the amplitude of the signal provided by the sensor. In typical installations, eight inductive sensors are alternately staggered about the circumference of an elongate member to detect circumferentially extending flaws, and it may be appreciated that the operator of the apparatus is unduly burdened by the requirement of visual examination of the traces formed by eight percent recorders forming traces on a strip of indicating material. Such interpretation is additionally subject to error due to the fact that chart recorders having multiple indicating pens utilize a different zero or reference line for each indicating pen and consequently require interpretation of each wiggly line against a different base. Therefore, data reduction and interpretation is time consuming and subject to error.

Additional problems exist in the fact that inspection of one elongate member is customarily accompanied by inspection of many other members resulting in operation of equipment over a long period of time. Continuous operation of recording equipment presenting a plurality of signals requires that time and/or temperature drift of the equipment be held to a minimum so that strict and constant inspection standards applied against the instantaneous peak amplitude of the signals recorded by the apparatus are constant from one member to another throughout a period of operations. This requirement is exceedingly difficult to meet in DC amplifiers but is accomplished by the circuit of this invention. This invention provides circuit means for amplifying a plurality of low-level DC signals for presentation to an operator on conventional means such as a strip recorder after the circuit functions to reject signals of a certain amplitude range which are not important in considering the structural integrity of an elongate, tubular member.

Therefore, an object of this invention is to provide a new and improved circuit for applying a plurality of inductively detected signals to a recording device in which high gain is achieved through a frequency responsive amplifier.

An important object of this invention is to provide a new and improved circuit shaping amplified signals in a collector resonant circuit including a capacitor connected to the supply voltage and a collector transformer having a reflected resistive load which is intermittently shorted by a chopper.

Another object of this invention is to provide a new and improved amplifying circuit for amplifying a signal having many frequency components and applying such signal to a moving needle recorder device having a limited frequency response range.

Yet a further object of this invention is to provide a new and improved circuit which chops and filters a low-level DC signal during amplification without altering the pertinent information content therein.

Still another object of this invention is to provide a new and improved circuit for amplifying a plurality of similar low-level DC signals and connecting same to a recorder which records the value of the largest instantaneous signal value present after deletion of the lesser, unimportant values.

Other objects and advantages of the present invention will become readily apparent from a consideration of the following description and drawing wherein:

The drawing is a schematic wiring diagram of the circuit of this invention.

In the drawing, the letter S indicates a sensor or detector of any conventional configuration supplying an output signal to a pair of conductors 10 and 11. The conductors 10 and 11 are connected to a chopper C which modulates the information content of the signals in the conductor pair 10 and 11 by operation in a conventional manner. The symbol A–1 refers to an amplifier connected to the output of the chopper C and A–2 is a second amplifier similar to the amplifier A–1 which also raises the voltage level of the signal output of the amplifier A–1. A driver amplifier A–3 is driven by the voltage output of the amplifier A–2 and includes a resonant circuit R which will be explained in more detail hereinafter. The output of the resonant circuit R is supplied to a current amplifier A–4 which is also connected to a circuit for passing peak values indicated generally at P.

The sensor S forms an output voltage fluctuating during the passage of time and containing various frequency components at various levels which are connected over the conductors 10 and 11 to the input terminals 12 and 13 which are connected to the chopper C for converting the DC signal to an AC signal. The input terminal 12 is connected to the vibrating or movable contact 15a of a mechanical chopper 15 which is operated in the conventional manner by voltage applied to the winding 15b. The chopper 15 includes a pair of contacts 15d and 15e which are connected to a pair of wires 16 and 17, respectively, extending to the tapped primary 18a of a transformer 18. The center tap 18b is connected by a wire 19 to the terminal 13 to complete the circuit with the input sensor S for supplying the chopped voltage to the amplifier A–1. The secondary 18d of the transformer 18 is grounded at one end and a wire 21 is connected from the secondary to a capacitor 22 which blocks the DC portion of the output signal of the transformer 18.

The amplifier A–1 is illustrated in the preferred embodiment as two stages of capacitance coupled transistor amplification including feed-back circuitry as a means for raising the signal level of the detector output to a voltage level adequate for recording purposes. The coupling capacitor 22 is connected to the base electrode 24b of a transistor 24 additionally having a collector electrode 24c and an emitter electrode 24e. The collector electrode 24c is connected to a resistor 25 operating as a collector load which is additionally connected to a wire 27 which supplies B+ voltage. The emitter 24e of the transistor 24 is connected first to a resistor 29 and a second resistor 30 bypassed by a capacitor 31 as a means of providing a steady DC bias voltage in the emitter circuitry. A resistor 32 is connected from the base 24b of the transistor 24 to ground whereby current flow therethrough establishes a bias voltage for operation of the transistor cooperating with the bias voltage established by the emitter circuitry to determine the operating point of the transistor. The amplified signal output of the transistor 24 is directly coupled to the base electrode 35b of an amplifying transistor 35 additionally having a collector electrode 35c and an emitter electrode 35e. The emitter circuit includes a pair of series resistors 36 and 37 with the resistor 37 being bypassed by a capacitor 38 to ground and a resistor 39 is connected between the capacitor 38 and the base 24b of the transistor 24 to provide a feed-back voltage altering the bias point of operation of the transistor 24 in accordance with the circuitry herein provided. The collector of the transistor 35 is connected to the B+ voltage in the wire 27 by a load resistor 40 and a feed-back path is formed from the collector 35c to the emitter 24e of the transistor 24 through a paralleled capacitor 41 and resistor 42 operating through a DC blocking condenser 43. The output signal of the transistor 35 is taken from the collector 35c by a coupling capacitor 44 for the next stage.

Means for controlling the gain of the circuit of this invention is provided by the potentiometer 48 which is connected to the coupling capacitor 44 and to ground. The resistor 48 includes a wiper arm 48a which is connected to a wire 49 which carries a signal to the amplifier A–2 illustrated in block form in the drawing. It may be appreciated that the amplifier A–2 may conveniently be identical to the amplifier A–1 or may have some other suitable configuration for amplifying the signal output of the resistor 48.

The wire 27 which supplies the operating voltage for the transistor 24 and transistor 35 is connected through a decoupling capacitor 49 and resistor 50 as a means of isolating stages between the amplifiers A–1 and A–2.

The output signal of the amplifier A–2 is supplied through a wire 52 to the amplifier stage A–3. The amplifier A–3 includes a transistor 55 connected in common emitter configuration with the signal supplied from the wire 52 connected to the base 55b through a coupling capacitor 56. Base bias voltage is obtained from the midpoint of a voltage divider network including a resistor 57 connected to a wire 58 through which B+ voltage is supplied and a resistor 59 extending from the base 55b to ground. The transistor 55 includes as additional electrodes the collector 55c and the emitter 55e with the emitter 55e connected to a pair of serially connected resistors 61 and 62 communicating with ground whereby current flow therethrough provides appropriate operating bias voltage between the base 55b and the emitter 55e. The resistor 62 is bypassed by a capacitor 63 as a means of maintaining a steady DC level across the resistor 62. The collector 55c is connected to a capacitor 64 which is connected to the wire 58 and the collector circuit includes an additional load coupled through a transformer 65 having its primary 65a connected directly to the collector 55c and to the wire 58 which conducts the collector supply voltage to the stage. The secondary 65b of the transformer is connected to a resistive load 66 with means for intermittently shorting the load 66 indicated generally at 69 having the preferred form of a mechanical chopper operated by voltage applied to the winding 69d. The chopper includes a movable contact 69a which is alternately connected to terminals 69b and 69c with the terminal 69b connected to ground and the terminal 69c connected to circuitry to be described hereinafter. A capacitor 70 provides a path to ground from the secondary 65b of the transformer 65 and a capacitor 71 is connected to the low voltage end of the load 66 and to the chopper terminal 69c through a wire 72 extending to the amplifier A–4.

Means for amplifying the current level of the signal in the conductor 72 are included in the amplifier A–4 which includes a pair of emitter follower circuits. The input transistor 75 has its base 75b directly connected to the wire 72 and develops an output voltage across a resistor 76 which is connected to the emitter terminal 75e. The collector 75c is connected through a resistor 77 and thence to the wire 58 for supply voltage with the output waveform taken off the emitter 75e and connected directly to the base 80b of a transistor 80. The collector 80c of the transistor 80 is connected to a wire 81 as is the resistor 76 which supplies a negative operating voltage. The emitter 80e of the transistor 80 is communicated with the conductor 58 by means of a resistor 82 across which signal voltage is developed and the output therefrom is connected through current limiting means such as the unidirectional conductive means 84 biased in the indicated direction to develop an output voltage across resistive leakage means 85 connected to ground. The voltage developed at an output terminal 86 is additionally connected to the outputs of other similar circuits through their current limiting means such as the diodes indicated generally at 87. The amplifier A–4 includes an additional transistor 90 connected with its emitter 90e communicating with the B+ voltage and the collector 90c connected to the emitter 75e of the input transistor with signals being derived from the collector 75c of the input transistor 75 which are directly connected to the base 90b.

Considering operation of the circuit of this invention on a typical signal derived from some detector S, further understanding of invention is obtainable. The output signal of the detector S is applied to the double acting converting means C which effectively modulates the low level DC signal which is coupled from the primary 18a of the transformer 18 to the secondary 18d having the form of an AC signal with one-half of the pulses being positive and the alternate pulses being negative. The AC signal is amplified in the amplifier A–1 in a conventional manner wherein the transistor 24 increases the amplitude of the AC signal and the transistor 35 increases to a greater extent the output of the transistor 24. The amplifier A–1 includes two feed-back paths operating in conventional manner through the emitter feed-back resistor 39 and the collector feed-back path through the capacitor 41 and the resistor 42. The output of the amplifier A–1 is supplied to means for adjusting the voltage level of the circuitry of this invention to a desired level and inputting same to the amplifier A–2.

As previously mentioned, the amplifier A–2 provides a further increase in the signal level of the AC signal output by the converting means C and may be similar to the amplifier A–1 in which case the description of the operation of the circuitry of the amplifier A–1 suffices for the amplifier A–2.

The amplifier stage of A–3 functions in conventional manner to operate a resonant collector load including the capacitor 64 and the transformer 65. When the chopper 69a operates to contact the terminals 69a and 69b, the secondary 65b of the transformer 65 is essentially connected to ground at both ends in which case the parallel combination of the condenser 64 and the primary 65a of the transformer form a resonant circuit which is preferably tuned to the frequency of the AC signal output by the transformer 18. In the preferred embodiment of this invention, the converting means C operates at 400 c.p.s. to provide an AC signal of 400 c.p.s. to which the frequency responsive means of the amplifier stage of A–3 responds. On the alternate half cycles of operation of the means for removing the added signal component, the voltage developed across the resistive load 66 is connected through the terminal 69c and the wire 72 to the amplifying stage A–4 during which operation the resistive load 66 is reflected into the primary resonant circuitry of the capacitor 64 connected to signal ground and the transformer 65 which is also connected to signal ground as is understood by those skilled in the art to provide an altered collector circuit load impedance. The signal conducted through the terminal 69c from the load of the transformer 65 takes the form of unipolar voltage flow during discrete intervals of time having frequencies within the frequency responsive range of the recorder operated by the circuit of this invention and which are amplified to higher current levels by the amplifier A–4.

The emitter follower transistors 75 and 80 of the amplifier A–4 increase the current level of the signals supplied over the wire 72 and maintain a voltage gain of slightly less than unity. Temperature compensation is provided by the transistor 90 to eliminate drift of the amplifier A–4 over a period of time, and, of course, the input impedance of the amplifier A–4 is quite high while the output impedance of the circuit is quite low. The output voltage is conducted through the diode 84 to the output terminal 86 which output voltage follows the signal provided by the amplifier A–4 during conduction of the diode 84. Since the circuit of this invention is particularly adapted for use in magnetic pipe inspection systems including a plurality of sensors S and based on the further fact that the mass of output data of a plurality of sensors S is meaningful only to the extent of ascertaining instantaneous peak values indicating magnetic field variations exterior elongate members undergoing inspection, a plurality of amplifying circuits such as that indicated in the drawing may be each connected to the plurality of sensors S with the output terminals collectively indicated on a single channel recording device such as a strip recorder through connection of the current limiting means 84 and 87 as indicated in the drawing. Thus, the maximum instantaneous signal derived from a plurality of inspection sensors is indicated at the terminal 86 while lesser signals which are of no importance in terms of evaluating the structural integrity of an elongate member are rejected to thereby reduce the mass of data subject to visual inspection by an operator of inspection apparatus seeking to discern amongst a plurality of elongate members those members having structural integrity and those members considered unsound due to structural flaws and other such anomalies.

Briefly, this invention relates to a circuit which shapes and amplifies low level DC signals from a plurality of sensors and presents for indication to a recording or indicating device only those signal voltages containing pertinent information relative to the inspection operation of the sensors.

What is claimed is:

1. A circuit for amplifying a low-level DC signal comprising:
   (a) an input terminal adapted to be connected to a low-level DC signal,
   (b) means for converting the DC signal to an AC signal connected to the input terminal,
   (c) amplifier means connected to the converting means for raising the signal level to a recording level,
   (d) an amplifier stage connected to the amplifier means including a transistor having a base electrode, a collector electrode and an emitter electrode with said collector electrode being connected to a collector circuit including:
      (1) a capacitive reactance means connected between a supply voltage and said collector electrode,
      (2) a collector transformer having a primary and a secondary winding with its primary winding connected between a supply voltage and said collector electrode,
      (3) load resistive means connected across the transformer secondary winding, and
      (4) means having first and second terminals for intermittently shorting the load resistive means to ground by connecting said load resistive means to said first terminal and for intermittently connecting said load resistive means to said second terminal,
   (e) current amplifying means connected to said load resistive means through said second terminal,
   (f) an output terminal, and
   (g) means connected between said output terminal and said current amplifying means for limiting current flow from the current amplifying means to the output terminal.

2. The circuit of claim 1 including manually adjustable gain control means connected between said amplifier means and said amplifier stage.

3. The circuit of claim 1 wherein said collector transformer and said capacitive reactance comprise a parallel resonant circuit.

4. The circuit of claim 1 including plural circuits for amplifying a low-level DC signal, said plural circuits being connected to a common output terminal.

5. Electric circuit means for amplifying an input information signal having plural frequency components to produce an amplified output information signal having a limited frequency range comprising:
   (a) converting means having an input and an output for converting an information signal appearing at the input of said converting means into an alternating current information signal having a first value of frequency at the output of said converting means;
   (b) voltage amplification means having an input and an output with the input of said voltage amplification means being connected to the output of said converting means for amplifying the voltage amplitude of the alternating current information signal and providing said amplified signal at the output of said voltage amplification means;
   (c) band pass means having an input and an output with the input of said band pass means connected to the output of said voltage amplification means for passing the components of the alternating current information signal having said first value of frequency from said input of said band pass means to the output of said band pass means;
   (d) second converter means having an input and an output with the input of said second converter means connected to the output of said band pass means for converting the alternating current signal appearing at the input of said second converter means into unipolar information pulses having a fixed frequency range at the output of said second converter means;
   (e) current amplification means having an input and an output with the input of said current amplification means being connected to the output of said second converter means for amplifying the current amplitude of the unipolar information pulses and providing said current amplified pulses at the output of said current amplification means; and
   (f) signal amplitude passing means having an input and an output with the input to said signal amplitude passing means being connected to the output of said current amplification means and the output of said signal amplitude passing means being connected to a circuit output terminal for passing the unipolar information pulses having voltage amplitudes above a fixed value to the circuit output terminal.

6. Plural circuits means as defined in claim 5 with the outputs of said signal amplitude passing means being connected to said circuit output terminal.

7. The circuit means of claim 5 wherein:
   (a) said converting means comprises a mechanical chopper;
   (b) said voltage amplification means comprises plural stages of transistor amplification and includes means for adjusting the voltage gain of said voltage amplification means;

(c) said band pass means comprises a parallel resonant circuit having a resonant frequency equal to said first value of frequency;

(d) said second converter means comprises a second mechanical chopper having a fixed frequency of vibration equal to twice the frequency of the unipolar information signals;

(e) said current amplification means comprises plural stages of transistor amplification and includes means for compensating temperature effects;

(f) said signal amplitude passing means comprises a semiconductor diode.

8. Plural circuits as defined in claim 7 with the outputs of said semiconductor diodes being connected to said circuit output terminal.

References Cited

UNITED STATES PATENTS

| 2,829,313 | 4/1958 | Moe | 330—10 X |
| 3,235,807 | 2/1966 | Appel | 307—88.5 X |

ARTHUR GAUSS, *Primary Examiner.*

J. JORDAN, *Assistant Examiner.*